United States Patent
Ganti et al.

(10) Patent No.: US 11,573,882 B2
(45) Date of Patent: *Feb. 7, 2023

(54) SYSTEMS AND METHODS FOR OPTIMIZING A MACHINE LEARNING-INFORMED AUTOMATED DECISIONING WORKFLOW IN A MACHINE LEARNING TASK-ORIENTED DIGITAL THREAT MITIGATION PLATFORM

(71) Applicant: Sift Science, Inc., San Francisco, CA (US)

(72) Inventors: Phani Srikar Ganti, San Francisco, CA (US); Eduard Chumak, San Francisco, CA (US); Pramod Jain, San Francisco, CA (US); Aaron Tietz, San Francisco, CA (US); Vincent Sordo, San Francisco, CA (US)

(73) Assignee: Sift Science, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/857,701

(22) Filed: Jul. 5, 2022

(65) Prior Publication Data

US 2022/0334946 A1 Oct. 20, 2022

Related U.S. Application Data

(63) Continuation of application No. 17/589,969, filed on Feb. 1, 2022, now Pat. No. 11,409,629.

(Continued)

(51) Int. Cl.
*G06F 9/44* (2018.01)
*G06F 11/34* (2006.01)
(Continued)

(52) U.S. Cl.
CPC ...... *G06F 11/3457* (2013.01); *G06F 11/3428* (2013.01); *G06F 21/51* (2013.01); *G06N 5/003* (2013.01); *G06N 20/00* (2019.01)

(58) Field of Classification Search
CPC .. G06F 11/3457; G06F 11/3428; G06F 21/51; G06N 20/00; G06N 5/003
See application file for complete search history.

(56) References Cited

U.S. PATENT DOCUMENTS

| | | |
|---|---|---|
| 7,272,587 B1 | 9/2007 | Przytula |
| 9,690,938 B1 * | 6/2017 | Saxe .................. G06N 20/00 |

(Continued)

*Primary Examiner* — Hang Pan
(74) *Attorney, Agent, or Firm* — Padowithz Alce; Chandler Scheitlin; Alce PLLC

(57) ABSTRACT

A system and method for adapting an errant automated decisioning workflow includes reconfiguring digital abuse or digital fraud logic parameters associated with automated decisioning routes of an automated decisioning workflow in response to identifying an anomalous drift or an anomalous shift in efficacy metrics of the automated decisioning workflow, wherein the automated decisioning workflow includes a plurality of distinct automated decisioning routes that, when applied in a digital threat evaluation of data associated with a target digital event, automatically compute a decision for disposing the target digital event based on a probability digital fraud; simulating, by computers, a performance of the automated decisioning routes in a reconfigured state based on inputs of historical digital event data; calculating simulation metrics based on simulation output data of the simulation; and promoting to an in-production state the automated decisioning workflow having the automated decisioning routes in the reconfigured state.

19 Claims, 4 Drawing Sheets

Related U.S. Application Data

(60) Provisional application No. 63/157,190, filed on Mar. 5, 2021.

(51) Int. Cl.
*G06N 20/00* (2019.01)
*G06N 5/00* (2006.01)
*G06F 21/51* (2013.01)

(56) References Cited

U.S. PATENT DOCUMENTS

| | | |
|---|---|---|
| 2004/0107132 A1 | 6/2004 | Honarvar et al. |
| 2008/0077544 A1* | 3/2008 | Sureka ................. G06K 9/6253 |
| | | 706/13 |
| 2013/0117280 A1 | 5/2013 | Donaldson et al. |
| 2014/0372158 A1* | 12/2014 | Favero ............... G06Q 30/0251 |
| | | 705/7.11 |
| 2015/0067857 A1* | 3/2015 | Symons ............. H04L 63/1408 |
| | | 726/23 |
| 2017/0063886 A1* | 3/2017 | Muddu ................. G06F 16/444 |
| 2017/0330109 A1* | 11/2017 | Maughan ................. G06N 5/04 |
| 2019/0019109 A1 | 1/2019 | Sadaghiani et al. |
| 2019/0020668 A1 | 1/2019 | Sadaghiani et al. |
| 2020/0372509 A1 | 11/2020 | Phalnikar |

* cited by examiner

200

Identifying Variations in Fraud Logic S205

Sourcing Workflow Testing Data S210

Configuring Workflow Simulation or Test Parameters S220

Customer/Subscriber Defined Configurations S222

System Defined Configurations Informed by Statistical Analysis S224

Implementing Proposed Workflow Simulation and Testing S230

Single Route Backtest S232

Full Workflow Shadow Test S234

Full Workflow Backtest S236

A/B Test S238

Creating Statistical Workflow Evaluations S240

Deploying a Succeeding Automated Decisioning Workflow S250

FIGURE 2

SYSTEMS AND METHODS FOR OPTIMIZING A MACHINE LEARNING-INFORMED AUTOMATED DECISIONING WORKFLOW IN A MACHINE LEARNING TASK-ORIENTED DIGITAL THREAT MITIGATION PLATFORM

CROSS-REFERENCE TO RELATED APPLICATIONS

This application is a continuation of U.S. patent application Ser. No. 17/589,969, filed 1 Feb. 2022, which claims the benefit of U.S. Provisional Application No. 63/157,190, filed 5 Mar. 2021, which are incorporated in their entireties by this reference.

TECHNICAL FIELD

This invention relates generally to the digital fraud and abuse field, and more specifically to a new and useful system and method for detecting digital fraud or digital abuse and evolving underlying machine learning models in the digital fraud and abuse field.

BACKGROUND

The modern web and Internet enable entities to engage and perform an incalculable number of activities. Many of these activities involve user-to-user activities, user-to-business activities (or the reverse), and the like. These activities between users and between users and organizational entities over the web often involve the access, use, and/or exchange of information by one or more of the parties of the activities. Because of the malleable nature of the digital realm that these activities operate within, there arise a countless number of digital threats by digital actors that aim to commit digital fraud and/or digital abuse using online services and/or Internet-accessible applications (e.g., web or mobile applications). Additionally, some of these bad digital actors may also aim to misappropriate the information (e.g., hack) being exchanged between legitimate entities to these activities. These digital threats may also be perpetrated by malicious third parties who seek to unlawfully or otherwise, impermissibly take advantage of the data or information that is exchanged or, if not exchanged, data or information about the activities or actions of users and/or businesses on the web.

Other digital threats involving a malicious party or a bad digital actor that acts unilaterally (or in concert with other malicious actors) to abuse digital resources of a service provider to perpetrate fraud or other unlawful activities that are also of significant concern to legitimate service providers and users of the Internet.

While there may currently exist some technologies that attempt to detect digital fraud and digital abuse or other malicious digital activities over the Internet, these existing technology implementations may not sufficiently detect malicious digital activities over the Internet with accuracy and in real-time to provide an opportunity for an appropriate response by an affected party. Additionally, these existing technology implementations lack the capabilities to detect new and/or never been encountered before digital threats and automatically (or near automatically) evolve the technology implementation to effectively respond and neutralize the digital threats.

Therefore, there is a need in the digital fraud and abuse field for a digital fraud and abuse solution that enables effective detection of multiple and specific digital threats involving digital fraud and/or digital abuse via digital resources of a service provider. The embodiments of the present application described herein provide technical solutions that address, at least, the need described above.

BRIEF SUMMARY OF THE INVENTION(S)

In one embodiment, a method for adapting an errant automated decisioning workflow for improving digital fraud or digital abuse mitigation includes generating a succeeding automated decisioning workflow by reconfiguring an incumbent automated decisioning workflow based on detecting an anomaly in automated decisioning outputs of the incumbent automated decisioning workflow, wherein the incumbent automated decisioning workflow comprises a plurality of distinct automated decisioning routes that, when applied in a digital threat evaluation of data associated with a target digital event, automatically compute a decision for disposing the target digital event based on a probability digital fraud or digital abuse associated with the target digital event, and wherein generating the succeeding automated decisioning workflow includes: tuning at least one automated decisioning route of the plurality of distinct decisioning routes of the incumbent automated decisioning workflow based on one or more in-production metrics of the automated decisioning outputs of the incumbent automated decisioning workflow; evaluating the succeeding automated decisioning workflow, wherein the evaluating includes implementing a route simulation of the succeeding automated decisioning workflow that simulates a performance of the at least one automated decisioning route of the plurality of distinct automated decisioning routes; computing one or more simulation metrics based on simulation output data of the route simulation of the succeeding automated decisioning workflow; and replacing the incumbent automated decisioning with the succeeding automated decisioning workflow if the one or more simulation metrics satisfy or exceed one or more efficacy benchmarks.

In one embodiment, the tuning the at least one automated decisioning route includes: estimating a rectifying edit that amends one or more decisioning criteria of the at least one automated decisioning route based on attributes associated with the anomaly in the automated decisioning outputs of the incumbent automated decisioning workflow.

In one embodiment, one of the one or more decisioning criteria of the at least one automated decisioning route comprises a machine learning-based score threshold, and the rectifying edit includes adapting the machine learning-based score threshold by increasing or by decreasing a machine learning score value or a machine learning score range of values associated with the machine learning-based score threshold.

In one embodiment, one of the one or more decisioning criteria of the at least one automated decisioning route comprises one or more adverse feature conditions, and the rectifying edit includes adapting the one or more adverse feature conditions by deleting one of the one or more adverse feature conditions or by augmenting the one or more adverse feature conditions with a new adverse feature condition.

In one embodiment, one of the one or more decisioning criteria of the at least one automated decisioning route comprises a machine learning-based score threshold defined by either a machine learning score value or a machine learning score range of values, and the rectifying edit includes adapting the at least one automated decisioning route to include one or more new adverse feature conditions.

In one embodiment, each of the plurality of distinct automated decisioning routes is arranged in a predetermined order within a sequence of the plurality of distinct automated decisioning routes, and the tuning the at least one automated decisioning route includes re-positioning the at least one automated decisioning route to a new position within the sequence of the plurality of distinct automated decisioning routes.

In one embodiment, each of the plurality of distinct automated decisioning routes is arranged in a predetermined order within a sequence of the plurality of distinct automated decisioning routes, and implementing the route simulation of the succeeding automated decisioning workflow includes: simulating the performance of the at least one automated decisioning route independently and outside of the sequence of the plurality of distinct automated decisioning routes.

In one embodiment, each of the plurality of distinct automated decisioning routes is arranged in a predetermined order within a sequence of the plurality of distinct automated decisioning routes, and implementing the route simulation of the succeeding automated decisioning workflow includes: simulating the performance of the at least one automated decisioning route in-place and within the sequence of the plurality of distinct automated decisioning routes.

In one embodiment, implementing the route simulation of the succeeding automated decisioning workflow includes: defining a simulation corpus of data comprising historical digital event data input to the incumbent automated decisioning workflow during a historical period; and simulating the performance of the at least one automated decisioning route based on inputs of the simulation corpus.

In one embodiment, implementing the route simulation of the succeeding automated decisioning workflow includes: setting the route simulation to a shadow mode, wherein during the shadow mode a copy of live digital event data passing through the incumbent automated decisioning workflow is additionally passed through the succeeding automated decisioning workflow, wherein in the shadow mode automated decisioning outputs of the succeeding automated decisioning workflow are not exposed via an application programming interface.

In one embodiment, during an implementation of the shadow mode, the route simulation is performed for all automated decisioning routes of the plurality of distinct automated decisioning routes of the succeeding automated decisioning workflow.

In one embodiment, the computing the one or more efficacy metrics based on the route simulation includes computing one or more route-specific efficacy metrics of the at least one automated decisioning route of the plurality of distinct automated decisioning routes.

In one embodiment, the one or more efficacy benchmarks comprise a minimum decisioning accuracy value that is calculated based on one or more accuracy metric values of the incumbent automated decisioning workflow.

In one embodiment, the evaluating the succeeding automated decisioning workflow includes comparing the one or more simulation metrics of the succeeding automated decisioning workflow against the one or more in-production metrics of the incumbent automated decisioning workflow and estimating whether the succeeding automated decisioning workflow mitigates or ameliorates the anomaly based on the comparison, wherein replacing the incumbent automated decisioning with the succeeding automated decisioning workflow is based on the estimation of whether the succeeding automated decisioning workflow mitigates or ameliorates the anomaly.

In one embodiment, a method for adapting an errant automated decisioning workflow includes reconfiguring digital abuse or digital fraud logic parameters associated with one or more automated decisioning routes of an automated decisioning workflow in response to identifying an anomalous drift or an anomalous shift in one or more efficacy metrics of the automated decisioning workflow, wherein the automated decisioning workflow comprises a plurality of distinct automated decisioning routes that, when applied in a digital threat evaluation of data associated with a target digital event, automatically compute a decision for disposing the target digital event based on a probability digital fraud or digital abuse associated with the target digital event; simulating, by one or more computers, a performance of the one or more automated decisioning routes in a reconfigured state based on inputs of historical digital event data input to the incumbent automated decisioning workflow during a historical period; calculating one or more simulation metrics based on simulation output data of the simulation of the automated decisioning workflow; and promoting to an in-production state the automated decisioning workflow having the one or more automated decisioning routes in the reconfigured state.

In one embodiment, reconfiguring the one or more automated decisioning routes of the automated decisioning workflow includes generating new fraud logic parameters that mitigate the anomalous drift or the anomalous shift of the automated decisioning workflow.

In one embodiment, the anomalous drift relates to a gradual change in metrics associated with decisioning outputs of the one or more automated decisioning routes over a period exceeding a minimum number of days.

In one embodiment, the anomalous shift relates to an abrupt change in metrics associated with decisioning outputs of the one or more automated decisioning routes over an abbreviated period not exceeding a maximum number of days or a maximum number of hours.

BRIEF DESCRIPTION OF THE FIGURES

FIG. 2 illustrates an example method in accordance with one or more embodiments of the present application;

DESCRIPTION OF THE PREFERRED EMBODIMENTS

Figure 1:
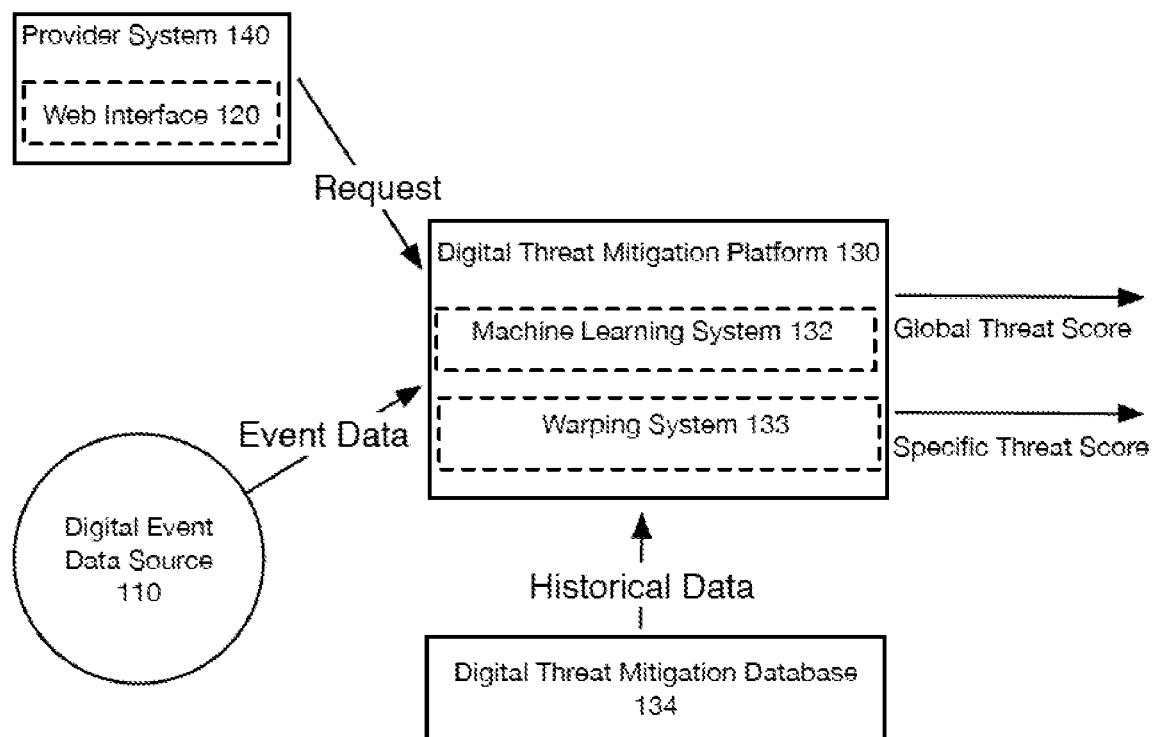
FIG. 1 illustrates a schematic representation of a system in accordance with one or more embodiments of the present application.
Figure 3:
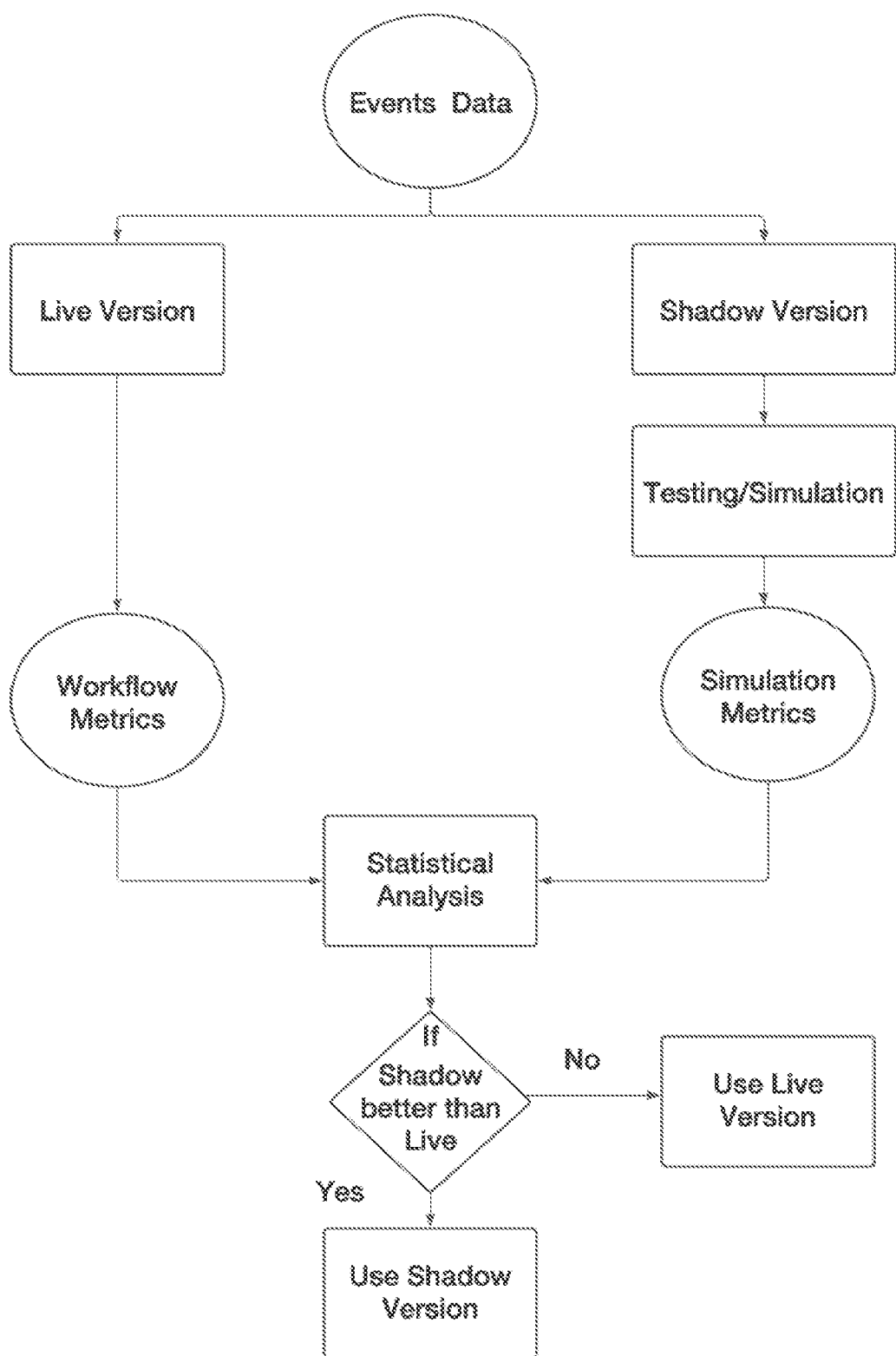
FIG. 3 illustrates an example schematic of shadow testing of an automated decisioning workflow in accordance with one or more embodiments of the present application.
Figure 4:
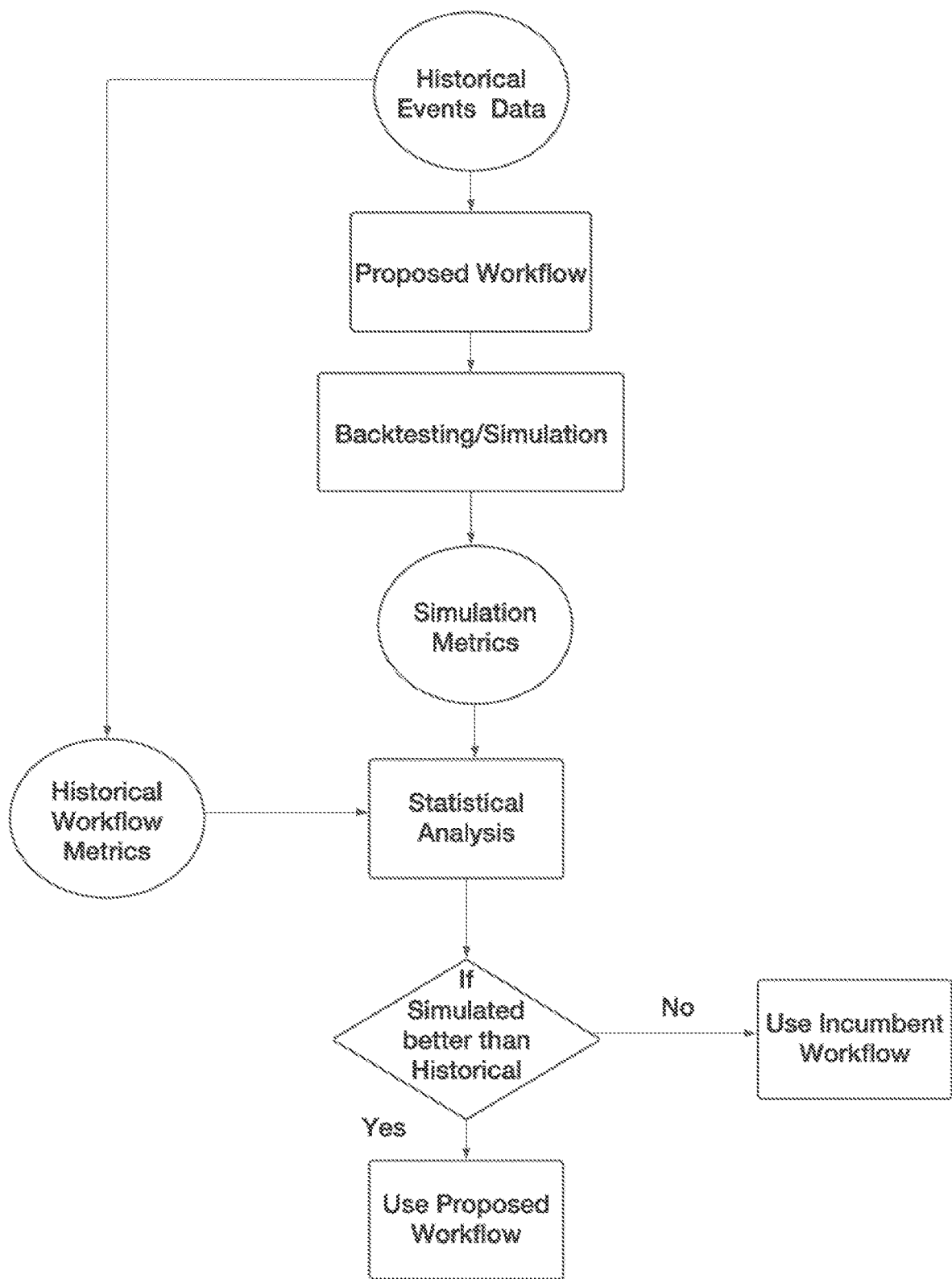
FIG. 4 illustrates an example schematic of backtesting of an automated decisioning workflow in accordance with one or more embodiments of the present application.

The following description of the preferred embodiments of the present application are not intended to limit the inventions to these preferred embodiments, but rather to enable any person skilled in the art to make and use these inventions.

Overview

As discussed above, digital threats are abounding and continue to evolve to circumvent existing digital fraud detection technologies. The evolving nature of digital threats compounded with the great number of transactions, events, actions, and/or activities (exceeding billions in number) occurring over the web and/or Internet highlight the many deficiencies of traditional digital fraud detection and threat mitigation implementations.

The embodiments of the present application, however, provide an advanced technology platform that is capable of ingesting billions of digital events and/or transactions over the Internet, the web, web applications, mobile applications, and the like and dynamically implement digital threat mitigation implementations that are capable of detecting malicious activities, fraudulent activities, digital abuses and generate digital threat mitigation recommendations and responses that operate to mitigate and/or eliminate the digital fraud and abuse threats stemming from the malicious or fraudulent activities, as described in U.S. Pat. No. 9,954,879, which is incorporated herein in its entirety by this reference.

The advanced technology platform of many embodiments of the present application employs a robust ensemble of machine learning models and related systems that operate to ingest the great number of digital activities performed and events occurring over the web. Accordingly, using these finely tuned and perpetually evolving and tunable machine learning models, a system implementing the several embodiments of the present application can predict a threat level and/or classify a digital threat with high accuracy and, in some embodiments, in real-time (e.g., as the event is occurring or shortly thereafter) compute a digital threat score for each event or activity that is received by the system.

The digital threat score may be exposed via a score application program interface (API) that may function to interact with various endpoints of the digital threat mitigation platform. Specifically, the score API may function to interact with one or more computing servers that implement the ensembles of machine learning models used to predict a likelihood of digital fraud and/or digital abuse. The score API may function to return a value (e.g., a number, likelihood or probability, or other criterion) that indicates how likely it is that an actor involved or associated with digital events and/or activities is a malicious actor or may be perpetrating cyber fraud or digital abuse (e.g., payment abuse, etc.). Accordingly, the digital threat score calculated by the score API may be used in several manners including to inform digital event data processing decisions (e.g., deny, hold, or approve digital transaction) or to define which of one or more digital threat mitigation protocols or implementations that should be applied to future digital event data and/or current the digital events to mitigate or eliminate a digital threat associated therewith. Additionally, or alternatively, in one or more embodiments, digital event data processing decisions may be automated via automated decisioning workflows, as described in U.S. Pat. No. 9,954,879, which is incorporated herein in its entirety by this reference and digital event data processing decisions may be performed with manual input from one or more human analysts or the like. In such embodiments, decisions output from one or more review queues of the one or more human analysts may be converted to training data for training and improving one or more threat classifying models of the threat mitigation service including, but not limited to, a unified threat model.

Workflows Overview

Additionally, the embodiments of the present application further enable the configuration of new digital threat mitigation automated decisioning workflows or implementations automatically upon a detection of a new (or evolved) digital threat or semi-automatically with digital threat input from an entity, as described in U.S. Pat. No. 9,954,879, which is incorporated herein in its entirety by this reference. That is, in some instances, the digital events and activities occurring via the Internet or web (including web and mobile applications) give rise to an unclassified or not fully classified potential digital threat that may require additional or new digital threat mitigation measures that may effectively mitigate the fraud risks associated the digital events. In such instances, the embodiments of the present application employ a digital threat mitigation engine that is capable of building new digital threat mitigation automated workflows or implementations that function to mitigate or eliminate digital threats posed by the unclassified or not fully classified potential digital threat. It shall be noted that, in some embodiments, the digital event posing the potential digital threat may be a classified digital event (e.g., payment abuse), however, due to the digital risks or other risks of loss, enhanced or new digital threat detection automated workflows according to the several embodiments of the present application may need to be implemented in the course of evaluating and processing the digital event.

Using a combination of the digital threat score calculated for a digital actor and/or digital event and a web user interface, the embodiments of the present application enable the definition of new or evolved digital threat mitigation automated workflows executed in association with a digital threat mitigation engine. In particular, via the web user interface, it is possible to identify or define digital events or digital activities occurring over the web or Internet that may be used to trigger a digital intervention (e.g., implementation the new digital threat mitigation automated workflows) and digital event or digital activity processing. The web user interface may similarly be used to define the specific routines and procedures executed by the digital threat mitigation engine once the threat mitigation automated workflows have been triggered.

The digital threat mitigation engine functions to use, as input, a digital threat score and service provider-defined digital threat mitigation automated workflows to generate one or more digital threat mitigation implementations, such as a digital threat mitigation flow. For instance, the digital threat mitigation engine may function to further configure an events API to collect and/or parse events or activity data from multiple events data sources to identify specific events data that may trigger the new digital threat mitigation implementations. In such instance, one aspect of the one or more digital threat mitigation implementations may include digitizing defined threat mitigation policy for integration and enhancement of threat mitigation capabilities of a pre-existing and broader digital threat mitigation service.

Workflow Testing Overview

Automated decisioning workflows may be used to manage the logic that determines which online users, digital orders, digital content, digital sessions and/or the like that may be blocked, given friction or review, or allowed to pass without friction.

One or more embodiments of the present application may enable dynamic handling of new automated decisioning routes into an existing automated decisioning workflow and/or a validation of new digital threat mitigation automated decisioning workflows.

In one or more embodiments, dynamic handling may include edits, adaptations, and/or upgrades to an existing automated decisioning workflow based on simulations or proposed automated workflow testing. In one or more embodiments, testing a proposed automated decisioning workflow may include, but is not limited to, simulating one or more alternate forms of a currently existing/incumbent automated decisioning workflow and analyzing the results to determine the outcomes that may have been achieved if one or more simulated versions of an automated decisioning workflow were active/live or in production. In one or more instances of the dynamic handling and testing/simulation, the digital events and activities occurring via the Internet or web (including web and mobile applications) may give rise to user traffic/events/transactions data that may require proposing entirely new automated decisioning workflows. In one or more of such examples, it may no longer be sufficient to test/simulate a modified version of a currently existing/incumbent version of an automated decisioning workflow. Thus, some embodiments of the present application further enable a creation of an entirely new automated decisioning workflow and performing simulations and/or workflow testings that may function to validate an efficacy of the newly proposed automated decisioning workflow.

1. System for Machine Learning-Based Identification of Digital Fraud and/or Abuse Detection As shown in FIG. 1, a system 100 for detecting digital fraud and/or digital abuse includes one or more digital event data sources 110, a web interface 120, a digital threat mitigation platform 130, and a service provider system 140.

The system 100 functions to enable a prediction of multiple types of digital abuse and/or digital fraud within a single stream of digital event data. The system 100 provides web interface 120 that enables subscribers to and/or customers of a threat mitigation service implementing the system 100 to generate a request for a global digital threat score and additionally, make a request for specific digital threat scores for varying digital abuse types. After or contemporaneously with receiving a request from the web interface 120, the system 100 may function to collect digital event data from the one or more digital event data sources 110. The system 100 using the digital threat mitigation platform 130 functions to generate a global digital threat score and one or more specific digital threat scores for one or more digital abuse types that may exist in the collected digital event data.

The one or more digital event data sources no function as sources of digital events data and digital activities data, occurring fully or in part over the Internet, the web, mobile applications, and the like. The one or more digital event data sources no may include a plurality of web servers and/or one or more data repositories associated with a plurality of service providers. Accordingly, the one or more digital event data sources no may also include the service provider system 140.

The one or more digital event data sources no function to capture and/or record any digital activities and/or digital events occurring over the Internet, web, mobile applications (or other digital/Internet platforms) involving the web servers of the service providers and/or other digital resources (e.g., web pages, web transaction platforms, Internet-accessible data sources, web applications, etc.) of the service providers. The digital events data and digital activities data collected by the one or more digital event data sources 110 may function as input data sources for a machine learning system 132 of the digital threat mitigation platform 130.

The digital threat mitigation platform 130 functions as an engine that implement at least a machine learning system 132 and, in some embodiments, together with a warping system 133 to generate a global threat score and one or more specific digital threat scores for one or more digital abuse types. The digital threat mitigation platform 130 functions to interact with the web interface 120 to receive instructions and/or a digital request for predicting likelihoods of digital fraud and/or digital abuse within a provided dataset. The digital threat mitigation engine 130 may be implemented via one or more specifically configured web or private computing servers (or a distributed computing system) or any suitable system for implementing system 100 and/or method 200.

The machine learning system 132 functions to identify or classify features of the collected digital events data and digital activity data received from the one or more digital event data sources 110. The machine learning system 132 may be implemented by a plurality of computing servers (e.g., a combination of web servers and private servers) that implement one or more ensembles of machine learning models. The ensemble of machine learning models may include hundreds and/or thousands of machine learning models that work together to classify features of digital events data and namely, to classify or detect features that may indicate a possibility of fraud and/or abuse. The machine learning system 132 may additionally utilize the input from the one or more digital event data sources 110 and various other data sources (e.g., outputs of system 100, system 100 derived knowledge data, external entity-maintained data, etc.) to continuously improve or accurately tune weightings associated with features of the one or more of the machine learning models defining the ensembles.

The warping system 133 of the digital threat mitigation platform 130, in some embodiments, functions to warp a global digital threat score generated by a primary machine learning ensemble to generate one or more specific digital threat scores for one or more of the plurality of digital abuse types. In some embodiments, the warping system 133 may function to warp the primary machine learning ensemble, itself, to produce a secondary (or derivative) machine learning ensemble that functions to generate specific digital threat scores for the digital abuse and/or digital fraud types. Additionally, or alternatively, the warping system 130 may function to implement a companion machine learning model or a machine learning model that is assistive in determining whether a specific digital threat score should be generated for a subject digital events dataset being evaluated at the primary machine learning model. Additionally, or alternatively, the warping system 133 may function to implement a plurality of secondary machine learning models defining a second ensemble that may be used to selectively determine or generate specific digital threat scores. Accordingly, the warping system 133 may be implemented in various manners including in various combinations of the embodiments described above.

The digital threat mitigation database 134 includes one or more data repositories that function to store historical digital event data. The digital threat mitigation database 134 may be in operable communication with one or both of an events API and the machine learning system 132. For instance, the machine learning system 132 when generating global digital threat scores and specific digital threat scores for one or more specific digital abuse types may pull additional data from the digital threat mitigation database 134 that may be assistive in generating the digital threat scores.

The ensembles of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), adversarial learning, and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, density-based spatial clustering of applications with noise (DBSCAN), expectation maximization, etc.), a bidirectional encoder representation form transformers (BERT) for masked language model tasks and next sentence prediction tasks and the like, variations of BERT (i.e., ULMFiT, XLM UDify, MT-DNN, SpanBERT, RoBERTa, XLNet, ERNIE, KnowBERT, VideoBERT, ERNIE BERT-wwm, GPT, GPT-2, GPT-3, ELMo, content2Vec, and the like), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be implemented in the various systems and/or methods described herein.

The service provider 140 functions to provide digital events data to the one or more digital event data processing components of the system 100. Preferably, the service provider 140 provides digital events data to an events application program interface (API) associated with the digital threat mitigation platform 130. The service provider 140 may be any entity or organization having a digital or online presence that enable users of the digital resources associated with the service provider's online presence to perform transactions, exchanges of data, perform one or more digital activities, and the like.

The service provider 140 may include one or more web or private computing servers and/or web or private computing devices. Preferably, the service provider 140 includes one or more client devices functioning to operate the web interface 120 to interact with and/or communication with the digital threat mitigation engine 130.

The web interface 120 functions to enable a client system or client device to operably interact with the remote digital threat mitigation platform 130 of the present application. The web interface 120 may include any suitable graphical frontend that can be accessed via a web browser using a computing device. The web interface 120 may function to provide an interface to provide requests to be used as inputs into the digital threat mitigation platform 130 for generating global digital threat scores and additionally, specific digital threat scores for one or more digital abuse types. Additionally, or alternatively, the web (client) interface 120 may be used to collect manual decisions with respect to a digital event processing decision, such as hold, deny, accept, additional review, and/or the like. In some embodiments, the web interface 120 includes an application program interface that is in operable communication with one or more of the computing servers or computing components of the digital threat mitigation platform 130.

The web interface 120 may be used by an entity or service provider to make any suitable request including requests to generate global digital threat scores and specific digital threat scores. In some embodiments, the web interface 120 comprises an application programming interface (API) client and/or a client browser.

Additionally, as shown in FIG. 2-FIG. 6, the systems and methods described herein may implement the digital threat mitigation platform in accordance with the one or more embodiments described in the present application as well as in the one or more embodiments described in U.S. patent application Ser. No. 15/653,373, which is incorporated by reference in its entirety.

2. Method for Optimizing Machine Learning-Based Automated Decisioning Workflows

As shown in FIG. 2, a method 200 for optimizing machine learning-based automated decisioning workflows includes sourcing automated decisioning workflows testing data S205, identifying changes in fraud logic S210, configuring automated decisioning workflow simulation or test parameters S220, implementing simulations and testing of proposed routes in proposed automated decisioning workflows S230, creating statistical automated decisioning workflow evaluations S240, and deploying a succeeding automated decisioning workflow S250.

2.05 Identifying Variations in Fraud Logic

Optionally, S205, which includes identifying variations in digital abuse and/or digital fraud logic, may function to compute or identify instances in which digital abuse and/or digital fraud variations or changes in patterns of events or activities of a subscriber may adversely affect a performance of and/or logic thresholds of one or more automated decisioning workflows. In one embodiment, S205 may function to recognize, based on computed variations metrics of a target workflow based on various stemming from fraud logic of the target workflow, a need to recalibrate one or more decisioning attributes of automated decisioning workflows of one or more subscribers.

In one or more embodiments, fraud or workflow logic may refer to a set of instructions (e.g., distinct fraud thresholds mapped to decision routes) that may be executed to identify and handle digital events that may be fraudulent. In some embodiments, S205 may enable a dynamic handling (change/update/reconfiguring) of fraud logic parameters by subscribers from time-to-time due to variations in a variety of factors including, but not limited to, fraud patterns, a shift in user activities pattern (e.g., more mobile users over time), system-generated threat score distributions, changes in services or product offerings of a subscriber, and/or the like.

In some embodiments, a performance of automated decisioning workflows may be measured by a plurality of workflow metrics. A relative weight may be assigned to each workflow metric depending on attributes of a subscriber by a threat mitigation service implementing the method 200. In one or more embodiments, automated decisioning workflow metrics may be monitored or measured at some predetermined intervals (e.g., at the end of each day, week, month and year etc.) to identify whether variations may exist in fraud patterns and/or fraud logic typically associated with a target automated decisioning workflow.

In a preferred embodiment, S205 may function to identify and predict a need for changes in fraud logic before the subscribers/customers or other end users experience a decline in performance level (e.g., increased frequency of manual review beyond a threshold value, increased frequency of fraudulent transaction attempts beyond a threshold value, increased frequency of user complaints beyond a threshold value, etc.) associated with a target automated decisioning workflow. In such preferred embodiment, S205 may function to preemptively expose one or more signals/triggers for modification of one or more automated decisioning workflow parameters and may alert the subscribers/customers or other end users to implement automated decisioning workflow modifications through simulation and/or testing techniques, as described herein, to improve automated decisioning workflow logic by using historical and/or live data in simulations to identify and make one or more changes in decisioning logic of the automated decisioning workflow based on overall workflow simulation outcomes.

In one or more preferred embodiments, S205 may function to enable subscribers/customers or other end users to view, via a web-based console or the like, simulation metrics corresponding to one or more routes in one or more proposed automated decisioning workflows over time in automated decisioning workflow reports and may show alerts for changes/updates in automated decisioning workflow metrics.

One or more of these embodiments may improve efficiency of one or more automated decisioning workflows by triggering an implementation of a solution before a reduction in the performance of an automated decisioning workflow may be detected by subscriber systems or third-party integrators or the like. In one or more embodiments, S205 may function to propose intelligent modifications or updates to automated decisioning workflows in advance of a threshold level of decline in one or more performance parameters of one or more automated decisioning workflows may be observed. For instance, in one or more embodiments, S205 may function to identify a potential decline in an efficacy of an automated decisioning workflow based on a detection of either a high level of false negatives or a high level of false positives based on outcomes of a subject automated decisioning workflow, as described in U.S. patent application Ser. No. 17/083,292, which is incorporated herein in its entirety by this reference. In another example, S205 may function to detect anomalous fraud logic patterns and/or the like based on an evaluation of distributions of the automated decisions of a subject automated decisioning workflow, as described in U.S. patent application Ser. No. 17/109,639, which is incorporated herein in its entirety by this reference.

In one or more variants, S205 may function to provide alerts/suggestions to subscribers/customers about potential changes based on the fraud logic assessment and related fraud or digital abuse patterns that may be made to one or more automated decisioning workflows to improve one or more performance metrics.

2.10 Sourcing Workflow Testing Data

S210, which includes sourcing automated decisioning workflow testing data, may function to source automated decisioning workflow testing data by collecting a corpus of historical events data, building a corpus of events data from live events data, or by building a corpus that includes a subset of historical and/or live event data. In one or more embodiments, if a workflow testing or simulation includes an incumbent or existing automated decisioning workflow, S210 may function to collect a corpus of historical events data, which may include events data previously used as model input into one or machine learning-based threat scoring models. In some embodiments, if a workflow testing or simulation includes a new or succeeding automated decisioning workflow, S210 may function to build a simulation corpus by sourcing live traffic or events data.

In one or more embodiments, S210 may function to include historical data from a predetermined period or time window (e.g., 30-90 days). The time window, in such embodiments, may be determined by a subscriber/customer and/or other end user and/or may be dictated by one or more threshold value requirements of a statistical or evaluation algorithm employed to generate simulation results in a visual form. In such embodiments, the subscriber/customer may select a data range between current/present time and/or date and the last possible date/time.

In some embodiments, simulation and testing of one or more decision routes in one or more automated decisioning workflows may be performed with data up to a point of a last edit or modification of one or more routes in the one or more automated decisioning workflows.

In one or more embodiments, when live data may be used for testing/simulation purposes, collection of training data samples may occur in parallel with testing. In some of these embodiments, S210 may function with a lag between data ingestion and testing.

2.20 Configuring a Workflow Simulation or Test Parameters

S220, which includes configuring an automated decisioning workflow simulation or test parameters, may function to receive or set one or more simulation configurations for a target automated decisioning workflow for testing one or more new or modified routes of the target automated decisioning workflow.

In one or more embodiments, S220 may function to suggest and/or determine modifications/alterations in one or more distinct routes of an automated decisioning workflow. In such embodiments, S220 may function to include constructing digital threat mitigation automated decisioning workflows according to the digital threat mitigation policy or automated decisioning workflow criteria. In such embodiments, the digital threat mitigation policy and/or automated decisioning workflow criteria may be informed by a plurality of distinct automated workflows deployed across the threat service platform for a plurality of distinct subscribers to the threat service.

In one or more embodiments, S220 may function to propose changes/updates in an automated decisioning workflow in the form of addition/deletion of one or more workflow or decisioning routes, modification of existing routes, merging existing routes and the like.

In one or more embodiments, S220 may function to employ a single route building experiment or simulation that uses current data: threat scores, fields, and machine learning model features at the time of the automated decisioning workflow event.

In some embodiments, configuring or defining parameters for one or more routes of a new or proposed automated decisioning workflow may include identifying one or more threat score threshold values for evaluating a computed machine learning-based threat score for a given event and identifying one or more corresponding rules or routes that may trigger the actions that should be taken automatically by the threat service for handling the given event if a corresponding threat score threshold is satisfied.

In a first implementation, S220 may function to create a copy of a target automated decisioning workflow. In such first implementation, one or more routes in the copy or duplicate of the target automated decisioning workflow may be modified based on one or more simulation parameters and implemented in an automated decisioning workflow simulation or automated decisioning workflow testing.

In a second implementation, S220 may function to create a copy of a target automated decisioning workflow and add one or more routes to the copy or duplicate of the target automated decisioning workflow in order to modify, improve or augment the capabilities of currently existing automated decisioning workflow.

In a third implementation, S220 may function to create an entirely new automated decisioning workflow without deference to a currently existing or live version of automated decisioning workflow. In one or more instances, the new automated decisioning workflow may comprise of a different number of routes and/or different threat score threshold value/s for one or more routes compared to the currently existing or live version of automated decisioning workflow.

In a fourth implementation, S220 may function to isolate a single target route in an automated decisioning workflow to allow for testing of the target route in isolation or in a vacuum. In this fourth implementation, simulating a single target route for a prospective automated decisioning workflow may function to simulate a performance of the single target route alone and without other routes that may typically precede or be prioritized ahead of the target single route in a full automated decisioning workflow. One or more of these implementations may be useful when it may take a longer time for user traffic/activity/transactions data to reach the target route if a full automated decisioning workflow testing is employed and/or when data flow to one route may not significantly affect the other routes in an automated decisioning workflow.

2.22 Subscriber-Defined Configurations

S220 includes S222, which may include identifying a proposed automated decisioning workflow for testing and/or simulations, may function to set or identify parameters for constructing or creating proposed decision routes or a proposed automated decisioning workflow based on subscriber-informed configurations. That is, in some embodiments, S222 may function to collect one or more proposed configurations for defining one or more aspects of an automated decisioning workflow which may include modifying one or more existing decisioning or workflow routes of a target automated decisioning workflow, creating an entirely new automated decisioning workflow without deference to an existing or incumbent automated decisioning workflow, and/or creating or defining one or more new decisioning routes that may be added to an incumbent or existing automated decisioning workflow.

In one or more embodiments, S220 may function to enable subscribers/customers or other end users to propose a new automated decisioning workflow that may be tested/simulated with live or historical user activity/events data alongside a currently existing/incumbent automated decisioning workflow.

In one or more embodiments, S222 may enable subscribers to iterate to craft a decision route candidate for a target or prospective automated decisioning workflow. One or more of these embodiments may allow subscribers/customers or other end users to modify threat score threshold values and actions that an automated decisioning workflow may take if the corresponding threshold threat score value is satisfied. One or more of these embodiments may enable the subscribers/customers or other end users to add and/or eliminate one or more routes in one or more automated decisioning workflows generated for testing or simulation.

In one or more embodiments, S222 may function to include instances when subscribers/customers or other end users may identify a need to modify one or more target routes in one or more target automated decisioning workflows. In one or more implementations, modifying one or more routes in one or more automated decisioning workflows may have technical benefits including, but not limited to improving manual review efficiency, mitigating a new type of fraud attack/digital payment abuse and/or the like. In one or more of these implementations, S222 may function to enable subscribers/customers or other end users to propose one or more variations of the target route/s in one or more newly proposed/modified/altered versions of the target automated decisioning workflow for testing/simulation with historical or live data.

In one or more embodiments, S222 may function to enable subscribers/customers or other end users to propose one or more entirely new automated decisioning workflows without deference to a currently existing or live version of automated decisioning workflow. In one or more instances, the new proposed automated decisioning workflow/s may comprise of a different number of routes and/or different threat score threshold value/s for one or more routes compared to the currently existing or live version of automated decisioning workflow.

2.24 System-Defined Configurations Informed by Statistical Analysis

S220 includes S224, which may include threat service-proposed workflow configuration changes based on a statistical evaluation of attributes of automated decisioning workflow data and/or events data, may function to identify automated decisioning workflow configurations proposed by a threat service or system implementing the method 200 that modifies/alters one or more routes in one or more incumbent automated decisioning workflows and/or propose new automated decisioning workflows that may be tested with live or historical data.

In one or more embodiments, the statistical evaluation may include identifying or computing one or more metrics based on trends in fraud pattern, user traffic/events data, changes in decision rates or decision distributions of an automated decisioning workflow, and/or the like.

In one or more embodiments, S224 may function to include system-defined configurations suggestions for new routes via statistical analysis. In one or more implementations, S224 may function to propose one or more new automated decisioning workflows without a deference to an incumbent automated decisioning workflow.

2.30 Implementing Proposed Workflow Simulations and Testing

S230, which includes implementing simulations and testing of proposed routes in proposed automated decisioning workflows, may function to simulate one or more routes in one or more proposed automated decisioning workflows with historical and/or live traffic or events data (and/or a subset of the data). In one or more embodiments, S230 may function to identify outputs or results of simulations or testing of the one or more proposed automated decisioning workflows thereby informing potential reconfigurations and/or adaptations to a target or incumbent automated decisioning workflow of a given subscriber.

2.32 Single Route Backtesting

S230 includes S232, which includes simulating a single route of an automated decisioning workflow in isolation/vacuum or as a part of a full automated decisioning workflow, may function to simulate a performance of a target decisioning route apart from existing decisioning routes of a subject automated decisioning workflow.

In a first implementation, S232 may function to include testing a new proposed route for an automated decisioning workflow. In this first implementation, a automated decisioning workflow may include a new proposed decisioning route or a modification of an existing decisioning route specifically designed to handle new potential digital fraud or digital abuse patterns (e.g., IP address in a foreign country, occurring within an atypical time range, etc.).

In a second implementation, S232 may function to include testing a route which is copied from a live version or incumbent automated decisioning workflow and modified to change parameters, e.g., threat score threshold values and/or the like.

In one or more embodiments, when proposed changes to an automated decisioning workflow by subscribers or threat service may include changes or adjustments to one route, e.g., refining a review route to detect more malicious or adverse events, or addition of a route with a very specific purpose e.g., to detect an emerging fraud/abuse or a specific fraud attack not being detected by a high score block route, S232 may function to test a route using historical data (e.g., 30-90 days), wherein the data may include fields, features and the like of previous automated decisioning workflows, to generate a summary of results that may have been achieved if the route being tested was the only route running/live/active.

In one or more embodiments, S232 may function to test a target automated decisioning route in the conditions described above for single route backtesting but 'in context of flow' which means that a proposed route may be tested such that an output of testing/simulation may not include automated decisioning workflow results of routes preceding the target automated decisioning route in a prioritized hierarchy of an automated decisioning workflow.

In one or more embodiments, S232 may function to test a route in the conditions described above for single route backtesting but 'in place' which may include testing the single route fully integrated with other workflow routes which may precede and/or follow the single route in an ordering or prioritization of workflow routes within an automated decisioning workflow. Such embodiments may be employed when historical data back to a time of the last edit above the route is used but in one or more embodiments, S232 may allow a simulation/test with historical data back to a maximum possible time with a warning for the subscriber/customer or other end user that automated decisioning workflow may have been edited over some time window in the past. In one or more implementations, this mode may be selected via a user interface or initiated/suggested by a system implementing the method 200. In one or more implementations, when this mode is selected/activated by subscriber/customer or other end user, the user interface may comprise of toggles, drop down choices, test criteria button and/or the like for selecting and/or activating the mode of simulation.

In one or more embodiments, S232 may function to implement one or more constraints or limitations in terms of number of simulations/tests conducted per minute per account or a maximum number of criteria subscribers/customers or other end users may vary in a test simulation.

In some embodiments, single route backtesting may enable multiple technical advantages including, but not limited to, avoiding unexpected changes in outcome rates (block, review, etc.), ensuring that changes to automated decisioning workflows result in an improvement in performance metrics. Therefore, in a preferred embodiment, it may be expected that the subscribers/customers or other end users who run single route backtesting prior to pushing a change to an automated decisioning workflow may make fewer changes in a subsequent period and have improved workflow efficacy metrics.

2.34 Full Workflow Shadow Simulation

S230 includes S234, which includes testing a new proposed automated decisioning workflow with live traffic data, may function to test a new automated decisioning workflow or an altered/modified version of an automated decisioning workflow without affecting a currently existing version of the automated decisioning workflow. The currently existing version or incumbent automated decisioning workflow may be referred to herein as live version of the automated decisioning workflow, and the altered/modified version may be referred to herein as shadow version of the automated decisioning workflow, may run in parallel and generate decisioning outputs that may be measured and used for performance monitoring, evaluation, and updates or modifications to an automated decisioning workflow.

In one or more embodiments, a shadow version may be turned on or off during testing/simulation period so that it may use all live user traffic/activity data or a subset of traffic/activity data. In such instances, subscribers/customers or other end users may determine a time period or conditions to trigger on/off modes of the shadow version of the automated decisioning workflow.

In one or more embodiments, S234 may function to generate and/or suggest a modified/altered automated decisioning workflow to create a shadow version of an automated decisioning workflow, test/simulate the shadow version of the automated decisioning workflow with live user activity data and collect results of simulation metrics.

In a first implementation, subscribers/customers or other end users may make a copy of the live version of the automated decisioning workflow to create a draft or tentative workflow for the shadow version of the automated decisioning workflow, wherein the subscribers/customers or other end users may edit one or more workflow routes of the shadow version of the automated decisioning workflow.

In a second implementation, subscribers/customers or other end users may make a copy of the live version of the automated decisioning workflow to create a draft for the shadow version of the automated decisioning workflow, wherein the subscribers/customers or other end users may add or delete one or more workflow routes in the shadow version of the automated decisioning workflow.

In a third implementation, subscribers/customers or other end users may make an entirely new version of the automated decisioning workflow to create a draft for the shadow version of the automated decisioning workflow, wherein the subscribers/customers or other end users may create one or more new proposed workflow routes in the shadow version of the automated decisioning workflow.

In one or more embodiments, S234 may function to allow subscribers/customers or other end users to make modifications to or add/delete one or more routes in a shadow version of an automated decisioning workflow during simulation/testing phase. Stated differently, subscribers/customers or other end users may edit a running or active proposed automated decisioning workflow being tested or simulated in a shadow mode. In some embodiments, a capability to edit a running shadow mode may allow subscribers/customers or other end users to dynamically make modifications to enable an accurate comparison with the live version of the automated decisioning workflow. For example, a shadow version of an automated decisioning workflow may be created to test one or more routes (e.g., routes 1 and 2 may be tested in a shadow version of an automated decisioning workflow), after a certain period of time, the subscriber/customer or other end user may make some modifications in threshold scores of one or more routes in a live version of the automated decisioning workflow (e.g., route 3 may now block a transaction if payment abuse threat score threshold value is 86 instead of 85), and/or the subscriber/customer or other end user may want to add or delete one or more routes in the live version of the automated decisioning workflow. In such instances, S234 may function to enable the subscribers/customers or other end users to make these adjustments in the shadow version of the automated decisioning workflow so that comparison of metrics may be accurate. In a preferred implementation, when the subscriber/customer or other end user publishes one or more changes in a live version of an automated decisioning workflow, they may be prompted or given an option to copy the changes to a shadow version of the automated decision workflow if the system finds one or more shadow versions of the automated decisioning workflow in parallel with the live version of the automated decisioning workflow.

In one or more embodiments, S234 may function to include shadow testing when a change may not need to take effect immediately and/or subscribers/customers may want to see the projected effects before applying a change. Additionally, or alternatively, S234 may function to deal with a new trend where historical data may not exist. In one or more implementations, S234 may function to include a new subscriber that may not have generated enough data for backtesting and/or a new product from an existing customer/subscriber that may not have generated enough data for backtesting.

In one or more embodiments, S234 may function to modify one or more workflow routes in an automated decisioning workflow to create a shadow version of an automated decisioning workflow and test the shadow version of the automated decisioning workflow in order to generate simulated decisioning outcomes and simulation metrics.

In one or more embodiments, a plurality of projected/planned automated decisioning workflows may be tested in parallel or sequentially and corresponding simulation metrics may be generated and incorporated in statistical analysis of performance of the plurality of the automated decisioning workflows.

In some embodiments, a shadow version of an automated decisioning workflow may have one or more constraints in terms of a simulation or testing time period (e.g., 15 days or the like). In some implementations, these constraints may be dictated by cost and utility. For instance, cost may exceed an allocated budget if a test/simulation is run on a shadow version of an automated decisioning workflow that lasts longer than a certain period of time. In one or more implementations, such cost may include, but is not limited to cost associated with using computational resources, storing data generated as a result of simulation/testing and/or the like. Additionally, or alternatively, in one or more implementations, improvement in accuracy of results obtained by running a test with a shadow version of the automated decisioning workflow may give diminishing results, if the test is run longer than a threshold duration. Alternatively, in some instances, converting a shadow version of an automated decisioning workflow to a live version of the automated decisioning workflow within a threshold time period after observing improvement in simulation metrics of the shadow version of the automated decisioning workflow may be a technical benefit. In one or more instances, the threshold time period to convert shadow version of an automated decisioning workflow to a live version of the automated decision workflow may be critical if the live version of the automated decisioning workflow shows declining performance metrics continuously over time and the shadow version of the automated decisioning workflow shows improved simulation metrics compared to the live version of the automated decisioning workflow.

In some embodiments, a shadow version of an automated decisioning workflow may have one or more constraints in terms of number of shadow automated decisioning workflows running per subscriber account at a time. In one or more implementations, subscribers/customers or other end users may be able to control/set/configure the number of shadow versions of an automated decisioning workflow running per account at a time.

2.36 Full Workflow Backtesting

S230 includes S236, which includes testing a new proposed automated decisioning workflow with historical data, may function to test/simulate one or more new and/or modified/altered routes of one or more automated decisioning workflows on a predetermined time window of historical data and compare simulation metrics with currently existing or live automated decisioning workflow metrics.

In one or more preferred embodiments, S236 may function to enable a subscriber or other end user to view full automated decisioning workflow or a subset of automated decisioning workflow performance as a snapshot or over time via a web-accessible interface or the like.

In one or more embodiments, subscribers/customers may identify a need to edit one or more target routes in an automated decisioning workflow, S236 may function to test potential variations of the target route/s using historical data to make an informed choice.

In one or more embodiments, S236 may function to include data/information of timings of changes/updates e.g., when automated decisioning workflows were edited, paused, or changed from run always to run on request.

In a first implementation, subscribers/customers or other end users may make a copy of a currently existing/incumbent version of an automated decisioning workflow to create a draft for a proposed version of the automated decisioning workflow, wherein the subscribers/customers or other end users may edit one or more routes of the proposed version of the automated decisioning workflow in order to simulate it with historical data of a predetermined time window.

In a second implementation, subscribers/customers or other end users may make a copy of a currently existing/incumbent version of an automated decisioning workflow to create a draft for a proposed version of the automated decisioning workflow, wherein the subscribers/customers or other end users may add or delete one or more routes in the proposed version of the automated decisioning workflow in order to simulate it with historical data of a predetermined time window.

In a third implementation, subscribers/customers or other end users may propose an entirely new version of an automated decisioning workflow to create a draft for the proposed version of the automated decisioning workflow, wherein the subscribers/customers or other end users may create one or more new proposed routes in the proposed version of the automated decisioning workflow in order to simulate it with historical data of a predetermined time window.

2.38 A/B Testing

S230 includes S238, which includes scenario-based testing of a proposed automated decisioning workflow with data allocated partially to each scenario, may function to identify results of proposed changes in a proposed new/modified automated decisioning workflow, which may intelligently support informed decisions for changes to or a creation of an automated decisioning workflow based on what-if scenarios and cause and effect analysis.

In one or more embodiments, S238 may function to apply changes to one or more routes of an automated decisioning workflow, such that the changes may be applicable to a small percentage of events/activities/transactions.

In one or more embodiments, S238 may function to test two different automated decisioning workflows and allocate 50% of user activity/events data to new automated decisioning workflow to determine one or more long term outcomes.

In one or more embodiments, A/B test may depend on seasons and marketing expenditure. For example, August vacation in Europe may result in fewer transactions/events/user traffic data from that region. Another example may be that marketing efforts for sales in December before Christmas may result in a higher number of transactions than usual and hence generate more user traffic/events data.

In one or more variants, S238 may function to include A/B/C etc. testing to test new fraud logic strategies on a plurality of subsets of events data and observe real results. In one or more of such instances, projected results may not be useful and/or accurate and hence testing/simulating with live events/activity data (or a subset of live events/activity data) may help improve performance of automated decisioning workflows.

2.40 Creating Statistical Workflow Evaluations

S240, which includes creating statistical automated decisioning workflow evaluations, may function to compute one or more statistical metrics of a simulation and create corresponding graphical comparisons of a proposed automated decisioning workflow and incumbent automated decisioning workflow.

In one or more embodiments, S240 may function to enable subscribers/customers or other end users to detect trends in performance of one or more routes of one or more automated decisioning workflows through automated decisioning workflow metrics including, but not limited to a block rate, a false positive rate, a false negative rate, an acceptance rate, a review rate, a fraud rate, and/or the like. In one or more implementations, this support subscribers/customers or other end users in addressing potential issues when statistical analysis shows one or more alarming or adverse trends.

In some embodiments, simulation and/or testing of one or more routes in one or more automated decisioning workflows may be performed with data up to a point of the last edit of one or more routes in one or more automated decisioning workflows, in such embodiments, S240 may function to enable visualization of a comparison of metrics. For instance, S240 may function to create and provide (e.g., display) two sets of bars within a bar graph or the like to denote metrics for tested/proposed automated decisioning workflow vs currently existing/incumbent automated decisioning workflow metrics.

In some embodiments of the present application, when single route backtesting is employed, S240 may function to augment the visual data representation results with a disclaimer/help text to inform subscribers/customers or other end users that for testing/simulating a route of an automated decisioning workflow in vacuum and/or with data beyond the last edit date, simulation metrics computed or generated by the system may not be an exact reflection of results that may have been produced by integrating the tested route with rest of the automated decisioning workflow but rather show results that may have been produced if the tested route had been at the top of the automated decisioning workflow and captured all possible users/orders and/or the like in its capacity.

In some embodiments, when full workflow shadow testing is employed, S240 may function to store results of simulation metrics for reporting purposes. In one or more implementations, such results may be stored for a certain time period. In a preferred implementation, this time period may be at least 120 days or the like. It shall be noted that any suitable time period for storing simulation metrics may be employed. Additionally, or alternatively, in a preferred implementation, simulation metrics may be stored in a way that allows for displaying in Workflow Metrics and Workflow Route Metrics. In one or more implementations, data of the results of the simulation metrics may be fetched, via an API or the like, for reports under a certain threshold time period. In one or more preferred implementations, this threshold time period may be 60 seconds or the like.

In some embodiments, when full workflow shadow testing is employed, S240 may function to enable subscriber/customer or other end user to view performance of one or more automated decisioning workflows in terms of simulation metrics over time and compare automated decisioning workflow metrics of a live version of an automated decisioning workflow and simulation metrics of one or more shadow versions of the automated decisioning workflow simultaneously (e.g., on the same graphical representation and/or chart and/or on the same screen and/or the like).

In one or more preferred embodiments, S240 may function to provide a user interface where subscribers/customers may identify users, transactions, events, activities and/or the like that are targeted towards one or more distinct routes in one or more distinct automated decisioning workflows. One or more of these embodiments may enable the subscribers/customers to visualize the differences between an incumbent automated decisioning workflow and a succeeding/proposed automated decisioning workflow. For example, in one or more such instances, S240 may function to build a review queue of the users that may have been blocked by one or more proposed version of an automated decisioning workflow in a simulation/test but may not have been blocked in a live/currently existing/incumbent version of the automated decisioning workflow.

In one or more embodiments, S240 may function to enable subscribers/customers to view workflow metrics or simulation metrics volume over time by one or more outcome types in a graphical representation over a certain period of time (hour/day/week/month). In one or more implementations, various types of outcomes of simulation metrics may include but are not limited to auto block rates/amount, auto watch rates/amount, auto allow rates/amount, manual block rates/amount, manual watch rates/amount, manual allow rates/amount, review queue timeout rates/amount, verification rates/amount, no action rates/amount, notification rates/amount, total volume of user activity/traffic data and/or the like.

In one or more embodiments, S240 may function to enable subscribers/customers to view cost (in dollars and/or other currencies) associated with each type of fraudulent activity and/or payment abuse e.g., chargeback rates, customer insult cost etc. In a preferred implementation, S240 may function to provide a breakdown of cost with respect to routes in an automated decisioning workflow, review subtype and/or the like.

In one or more embodiments, S240 may function to enable subscribers/customers to compare two or more automated decisioning workflows that may have run over the same time period, on the same triggers, using the same simulation metrics, and using the same graphical representation. In one or more implementations, such comparisons may include but are not limited to backtest vs. live, backtest vs. backtest, shadow vs. live, shadow vs. shadow, shadow vs. backtest and/or the like.

2.5 Deploying a Succeeding Automated Decisioning Workflow

S250, which includes deploying a succeeding automated decisioning workflow, may function to convert a proposed or tested automated decisioning workflow to a live automated decisioning workflow based on a statistical analysis of the simulations or validations of (i) the proposed modifications of an automated decisioning workflow or (ii) a validation of routes of a new automated decisioning workflow.

In one or more embodiments, S250 may function to include implementing a proposed digital threat mitigation based automated decisioning workflow in parallel with an existing/incumbent digital threat mitigation scheme and/or an existing/incumbent automated decisioning workflow in order to compare and measure one or more performance or simulation metrics of the automated decisioning workflows and to make an informed decision on whether to replace the existing/incumbent automated decisioning workflow with the newly generated/constructed/proposed automated decisioning workflow and/or to augment the existing automated decisioning workflow with one or more routes of the newly proposed automated decisioning workflow.

In one or more embodiments, S250 may function to enable a subscriber/user to replace a live/current or existing/incumbent version of automated decisioning workflow with a shadow/backtested version of the automated decisioning workflow.

In one or more embodiments, S250 may function to compare one or more simulation metrics of one or more proposed routes in a new or modified automated decisioning workflow against one or more automated decisioning workflow metrics of one or more routes of a currently existing/incumbent automated decisioning workflow. In such embodiments, if the proposed new/modified automated decisioning workflow shows improved simulation metrics (e.g., less chargeback cost and/or the like), S250 may then function to update the currently existing/incumbent automated decisioning workflow and replace it with the proposed/simulated/tested automated decisioning workflow. Alternatively, in some other embodiments, if the tested automated decisioning workflow shows simulation metrics indicating a decline in performance compared to the automated decisioning workflow metrics of a currently existing or incumbent version of an automated decisioning workflow, S250 may then function to ignore the proposed changes and keep the currently existing/incumbent automated decisioning workflow in its original form.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

We claim:

1. A method for adapting an errant automated decisioning workflow for improving digital fraud or digital abuse mitigation, the method comprising:
generating a succeeding automated decisioning workflow by reconfiguring an incumbent automated decisioning workflow based on identifying an anomaly associated with automated decisioning outputs of the incumbent automated decisioning workflow,
wherein the generating the succeeding automated decisioning workflow includes:
tuning at least one automated decisioning route of the incumbent automated decisioning workflow, wherein the tuning the at least one automated decisioning route includes:
estimating a rectifying edit that amends one or more decisioning criteria of the at least one automated decisioning route based on attributes associated with the anomaly, wherein one of the one or more decisioning criteria of the at least one automated decisioning route comprises a machine learning-based score threshold, and the rectifying edit includes adapting the machine learning-based score threshold by increasing or by decreasing a machine learning score value or a machine learning score range of values associated with the machine learning-based score threshold;
evaluating the succeeding automated decisioning workflow based on a computer-based simulation of the succeeding automated decisioning workflow that simulates a performance of the at least one automated decisioning route;

computing one or more simulation metrics based on simulation output data of the computer-based simulation of the succeeding automated decisioning workflow; and replacing the incumbent automated decisioning workflow with the succeeding automated decisioning workflow if the one or more simulation metrics satisfy or exceed one or more efficacy benchmarks.

2. The method according to claim 1, wherein:
one of the one or more decisioning criteria of the at least one automated decisioning route comprises one or more adverse feature conditions, and
the rectifying edit includes adapting the one or more adverse feature conditions by deleting one of the one or more adverse feature conditions or by augmenting the one or more adverse feature conditions with a new adverse feature condition.

3. The method according to claim 1, wherein:
the incumbent automated decisioning workflow comprises a plurality of distinct automated decisioning routes;
each of the plurality of distinct automated decisioning routes is arranged in a predetermined order within a sequence of the plurality of distinct automated decisioning routes, and
the tuning the at least one automated decisioning route includes re-positioning the at least one automated decisioning route to a new position within the sequence of the plurality of distinct automated decisioning routes.

4. The method according to claim 1, wherein:
the incumbent automated decisioning workflow comprises a plurality of distinct automated decisioning routes;
each of the plurality of distinct automated decisioning routes is arranged in a predetermined order within a sequence of the plurality of distinct automated decisioning routes, and
the computer-based simulation includes simulating the performance of the at least one automated decisioning route independently and outside of the sequence of the plurality of distinct automated decisioning routes.

5. The method according to claim 1, wherein:
the incumbent automated decisioning workflow comprises a plurality of distinct automated decisioning routes;
each of the plurality of distinct automated decisioning routes is arranged in a predetermined order within a sequence of the plurality of distinct automated decisioning routes, and
the computer-based simulation includes simulating the performance of the at least one automated decisioning route in-place and within the sequence of the plurality of distinct automated decisioning routes.

6. The method according to claim 1, wherein
the computing the one or more simulation metrics includes computing one or more route-specific simulation metrics of the at least one automated decisioning route.

7. The method according to claim 1, wherein
the one or more efficacy benchmarks comprise a minimum decisioning accuracy value that is calculated based on one or more accuracy metric values of the incumbent automated decisioning workflow.

8. The method according to claim 1, wherein
the evaluating the succeeding automated decisioning workflow includes comparing the one or more simulation metrics of the succeeding automated decisioning workflow against one or more in-production metrics of the incumbent automated decisioning workflow,
the method further comprises:
estimating whether the succeeding automated decisioning workflow mitigates or ameliorates the anomaly based on the comparison, wherein replacing the incumbent automated decisioning workflow with the succeeding automated decisioning workflow is based on the estimation of whether the succeeding automated decisioning workflow mitigates or ameliorates the anomaly.

9. The method according to claim 1, further includes:
transmitting, by one or more computers, an anomalous workflow notification to a subscriber associated with the incumbent automated decisioning workflow to inform the subscriber that the incumbent automated decisioning workflow is associated with anomalous behavior.

10. The method according to claim 9, wherein:
the transmitting of the anomalous workflow notification to the subscriber alerts the subscriber in advance of a subscriber observation of a threshold level of decline in one or more performance parameters of the incumbent automated decisioning workflow.

11. A method for adapting an errant automated decisioning workflow for improving digital fraud or digital abuse mitigation, the method comprising:
generating a successor automated decisioning workflow by reconfiguring an incumbent automated decisioning workflow based on identifying an anomaly associated with the incumbent automated decisioning workflow, wherein:
the incumbent automated decisioning workflow comprises a plurality of distinct automated decisioning routes;
each of the plurality of distinct automated decisioning routes is arranged in a predetermined order within a sequence of the plurality of distinct automated decisioning routes, and
wherein generating the successor automated decisioning workflow includes:
modifying one or more digital abuse or digital fraud logic parameters of at least one automated decisioning route of the incumbent automated decisioning workflow;
evaluating the successor automated decisioning workflow based on a computer-based simulation of the successor automated decisioning workflow that tests a performance of the at least one automated decisioning route, wherein the computer-based simulation includes simulating the performance of the at least one automated decisioning route in-place and within the sequence of the plurality of distinct automated decisioning routes;
calculating, by one or more computers, one or more simulation metrics based on the computer-based simulation of the successor automated decisioning workflow; and
substituting the incumbent automated decisioning workflow with the successor automated decisioning workflow if one or more workflow substitution characteristics is satisfied.

12. The method according to claim 11, wherein:
one of the one or more workflow substitution characteristics is satisfied if the one or more simulation metrics satisfy or exceed one or more target efficacy benchmarks.

13. The method according to claim 11, further comprising:

transmitting, by the one or more computers, an anomalous workflow notification to a subscriber associated with the incumbent automated decisioning workflow to inform the subscriber that the incumbent automated decisioning workflow is associated with anomalous behavior.

14. The method according to claim 13, wherein:

the transmitting of the anomalous workflow notification to the subscriber preemptively alerts the subscriber in advance of a subscriber observation of a threshold level of decline in one or more performance parameters of the incumbent automated decisioning workflow.

15. The method according to claim 11, wherein the identifying the anomaly of the incumbent automated decisioning workflow relates to identifying an anomalous drift associated with the incumbent automated decisioning workflow; and modifying the one or more digital abuse or digital fraud logic parameters of the at least one automated decisioning route includes generating new fraud logic parameters that mitigates the anomalous drift.

16. The method according to claim 11, wherein the identifying the anomaly of the incumbent automated decisioning workflow relates to identifying an anomalous shift associated with the incumbent automated decisioning workflow; and modifying the one or more digital abuse or digital fraud logic parameters of the at least one automated decisioning route includes generating new fraud logic parameters that mitigates the anomalous shift.

17. A method for adapting an errant automated decisioning workflow for improving digital fraud or digital abuse mitigation, the method comprising:

generating a succeeding automated decisioning workflow by reconfiguring an incumbent automated decisioning workflow based on identifying an anomaly associated with automated decisioning outputs of the incumbent automated decisioning workflow, wherein:

the incumbent automated decisioning workflow comprises a plurality of distinct automated decisioning routes;

each of the plurality of distinct automated decisioning routes is arranged in a predetermined order within a sequence of the plurality of distinct automated decisioning routes;

wherein the generating the succeeding automated decisioning workflow includes:

tuning at least one automated decisioning route of the incumbent automated decisioning workflow, wherein the tuning the at least one automated decisioning route includes re-positioning the at least one automated decisioning route to a new position within the sequence of the plurality of distinct automated decisioning routes;

evaluating the succeeding automated decisioning workflow based on a computer-based simulation of the succeeding automated decisioning workflow that simulates a performance of the at least one automated decisioning route;

computing one or more simulation metrics based on simulation output data of the computer-based simulation of the succeeding automated decisioning workflow; and replacing the incumbent automated decisioning workflow with the succeeding automated decisioning workflow if the one or more simulation metrics satisfy or exceed one or more efficacy benchmarks.

18. The method according to claim 17, wherein the tuning the at least one automated decisioning route includes:

estimating a rectifying edit that amends one or more decisioning criteria of the at least one automated decisioning route based on attributes associated with the anomaly.

19. The method according to claim 18, wherein:

one of the one or more decisioning criteria of the at least one automated decisioning route comprises a machine learning-based score threshold, and the rectifying edit includes adapting the machine learning-based score threshold by increasing or by decreasing a machine learning score value or a machine learning score range of values associated with the machine learning-based score threshold.

* * * * *